US006992686B2

(12) United States Patent
Nagarajan

(10) Patent No.: US 6,992,686 B2
(45) Date of Patent: Jan. 31, 2006

(54) SYSTEM AND METHOD FOR DYNAMIC CONTROL OF FILE SIZE

(75) Inventor: Ramesh Nagarajan, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/867,127

(22) Filed: Jun. 14, 2004

(65) Prior Publication Data

US 2005/0275666 A1 Dec. 15, 2005

(51) Int. Cl.
  *G09G 5/00* (2006.01)
  *G06K 9/00* (2006.01)
(52) U.S. Cl. ............... 345/660; 382/162; 382/167; 345/667
(58) Field of Classification Search ........ 345/660, 345/667–670; 382/162–166, 173, 232; 711/100
See application file for complete search history.

(56) References Cited

U.S. PATENT DOCUMENTS

| 5,655,061 A | 8/1997 | Tse et al. |
| 5,767,978 A | 6/1998 | Revankar et al. |
| 5,786,906 A | 7/1998 | Shishizuka |
| 5,911,004 A | 6/1999 | Ohuchi et al. |
| 5,973,804 A | 10/1999 | Yamada |
| 6,081,211 A * | 6/2000 | de Queiroz et al. .......... 341/65 |
| 6,128,413 A * | 10/2000 | Benamara ................. 382/251 |
| 6,377,703 B1 | 4/2002 | Yeung |
| 6,636,958 B2 * | 10/2003 | Abboud et al. ............ 711/173 |
| 6,832,007 B1 * | 12/2004 | Zhang et al. ............... 382/257 |
| 2002/0099884 A1 * | 7/2002 | Chang et al. ................ 710/62 |
| 2002/0101609 A1 * | 8/2002 | Fan .......................... 358/1.15 |
| 2002/0176631 A1 * | 11/2002 | Li ............................ 382/238 |
| 2004/0052416 A1 * | 3/2004 | Curry et al. ............... 382/173 |
| 2004/0109182 A1 | 6/2004 | Nagarajan |
| 2004/0114813 A1 * | 6/2004 | Boliek et al. ............. 382/233 |
| 2004/0114814 A1 * | 6/2004 | Boliek et al. ............. 382/233 |

OTHER PUBLICATIONS

H. Cheng and Z. Fan; "Background Identification Based Segmentation and Multilayer Tree Based Representation of Document Images," Proceedings of IEEE International Conference on Image Processing, ICIP.

Z. Fan and M. Xu; "A Simple Segmentation Algorithm for Mixed Raster Contents Image Representation"; Digital Imaging Technology Center; Xerox Corporation; Webster, NY; Jan. 2001.

* cited by examiner

*Primary Examiner*—Michael Razavi
*Assistant Examiner*—Eric Woods
(74) *Attorney, Agent, or Firm*—Basch & Nickerson LLP; Duane C. Basch

(57) ABSTRACT

The present invention is a system and method for dynamically altering the size of scanned image files based on the export file size, network demand and/or transmission requirements specified by a system administrator or end user. An embodiment as described here discusses about pushing the color text/edges into the black mask as the first approach in order to reduce file size at the expense of color fidelity.

12 Claims, 3 Drawing Sheets

SYSTEM AND METHOD FOR DYNAMIC CONTROL OF FILE SIZE

CROSS-REFERENCE TO RELATED APPLICATION

The following co-pending and commonly assigned application is hereby incorporated by reference in its entirety:

U.S. application Ser. No. 10/315,267, by Ramesh Nagarajan, et al., filed Dec. 9, 2002, for a "SYSTEM FOR SELECTING A COMPRESSION METHOD FOR IMAGE DATA."

This invention relates generally to the export and storage of scanned image files, and more particularly to a system and method to utilize a mixed raster content (MRC) image format to dynamically alter the size of scanned image files to facilitate export, storage, transmission, etc.

BACKGROUND AND SUMMARY OF THE INVENTION

The present invention is directed to a system and method for dynamic image file size manipulation in order to meet specified size limitations. The present invention utilizes image segmentation to produce a mixed raster content (MRC) image with constant foreground layers representing black/white (B/W) text or line art or graphics. Furthermore, the MRC image size may be dynamically controlled so as not to exceed a particular size so as to assure that the image does not exceed network bandwidth, storage or similar capacity constraints.

MRC (Mixed Raster Content) is a powerful image representation concept in achieving high compression ratios while maintaining high reconstructed image quality. MRC has also been established as a compression standard. Within MRC, a basic three-layer (plane) model (contone foreground, contone background, and binary mask) is the most common representation form. It represents a color raster image using a background layer and a mask and foreground layer pair. The foreground and background layers are normally contone bitmaps, while the mask is usually binary. The Mask layer describes how to reconstruct the final images from the other two layers. When the Mask layer pixel value is 1, the corresponding pixel from the Foreground layer is selected for the final image; when it is 0, the corresponding pixel from the Background layer is selected. Each layer may be compressed individually by a suitable compression process. For contone image layers, JPEG is often employed, wherein the Q-factor of the compression is varied in order to achieve better compression ratios at the risk of image quality.

Digital image file size has been an important consideration for users when dealing with the storage and transmission of such files, and more particularly with the introduction of multifunction machines that enable a scan-to-export feature that can, with the touch of a button, scan an image and transfer it to a predetermined destination. More specifically, scanning color documents to networks is becoming a standard feature on many devices. High quality, scanned documents are increasingly used in many applications and the storage/network requirements for these documents are large. In some instances, mixed raster content output is being offered as a selection in the scan-to-export selection of digital multifunction devices to reduce the file size. Using MRC, the document is first analyzed and two layers are extracted—a text/mask layer and an image/background layer. The two layers are then compressed using different compression schemes—currently the mask layer is compressed using TIFF-G4 compression techniques, whereas the image layer is compressed using JPEG compression techniques.

However, the MRC format may still not be sufficient in certain markets where there is a very stringent requirement or limitation for file size of scanned images. Currently, several different compression quality modes are offered that produce different levels of image quality, and therefore file sizes. However, a user does not have an easy way maximize or optimize the image quality with respect to an imposed file size requirement or constraint. This often results in the frustrating experience of a user having to try different compression settings to arrive at a decision that trades off file size limitations for image quality and vice versa.

The present invention is directed to a system and/or which enables a, operational "mode" whereby a system administrator could set a maximum limit on any exported file size from an image input terminal such as a walk-up scanner. In response to the limit, the scanning device, or an associated image processor, dynamically changes the parameters needed to segment a scanned image into layers for exporting in accordance with the MRC model, so that final exported file size remains within the specified limit. Such a system, it is believed, will result in increased user satisfaction by eliminating the need for iterative selection of scanning/compression modes.

In accordance with the present invention, there is provided an image input system, comprising: an image input device suitable for generating data representing a color digital image; memory, connected to the image input device for storing the data representing the a color digital image; and an image processor, for retrieving from said memory data representing the color digital image, said image processor operating in response to a pre-programmed set of instructions to process the data representing the image and generate an image file in accordance with a predefined format, wherein the image processor dynamically controls the size of the image file in response to a predefined requirement.

In accordance with another aspect of the present invention, there is provided a method for dynamically controlling the file size of a color digital image, comprising the steps of: (a) receiving uncompressed color digital image data; (b) using the digital image data, segmenting the digital image to identify segments of the image, including identification of a first set of segments of the image suitable for representation as a single color and a second set of segments suitable for representation as contone; (c) estimating the size of the compressed image based upon said segmenting step, wherein at least first set of segments are to be compressed in accordance with a first method applicable to single color segments to create a first image plane and the second set of segments are to be compressed in accordance with a second method applicable to contone segments to create a second image plane; (d) determine whether an estimated size of the compressed image is within a predefined file size limit; and if so, proceeding at step (f), otherwise (d) identifying at least one segment within the second set of segments for representation as a single color and for incorporation into said first set of segments and said first image plane; (e) repeating the steps above, beginning at step (c); (f) creating the first image plane based upon image data for the first set of segments and creating the second image plane based upon image data for the first set of segments, wherein at least the second image plane is compressed; and (g) outputting the data for the first and second image planes.

One aspect of the invention is based on the discovery that a user is often willing to compromise on the color fidelity of some portions of a scanned document in order to reduce files size of the document, and that it is possible to iteratively estimate the size of a scanned document using an MRC image format. This discovery avoids problems that arise in using multifunction devices such as walk-up scanner/copiers and scan-to-export features on such systems—eliminating the need for the user to "manually" adjust image quality to achieve desired output file size. Using the techniques set forth herein, the present invention is able to produce a representation of an image in a modified (two-layer) MRC format that is suitable for network transmission and storage on local or networked devices. Accordingly, the present invention enables, through the use of image segmentation and compression, the dynamic adjustment of a scanned image in order to automatically achieve or stay within a file size limitations, but does so in a manner that selectively maximizes the color fidelity of the scanned image. As a result of the techniques employed in accordance with the present invention, users of scanners and multifunction devices, and scan-to-export features of such systems, will be able to automatically optimize the quality of the scanned images while meeting any self or network imposed file size limitations.

Figure 1:
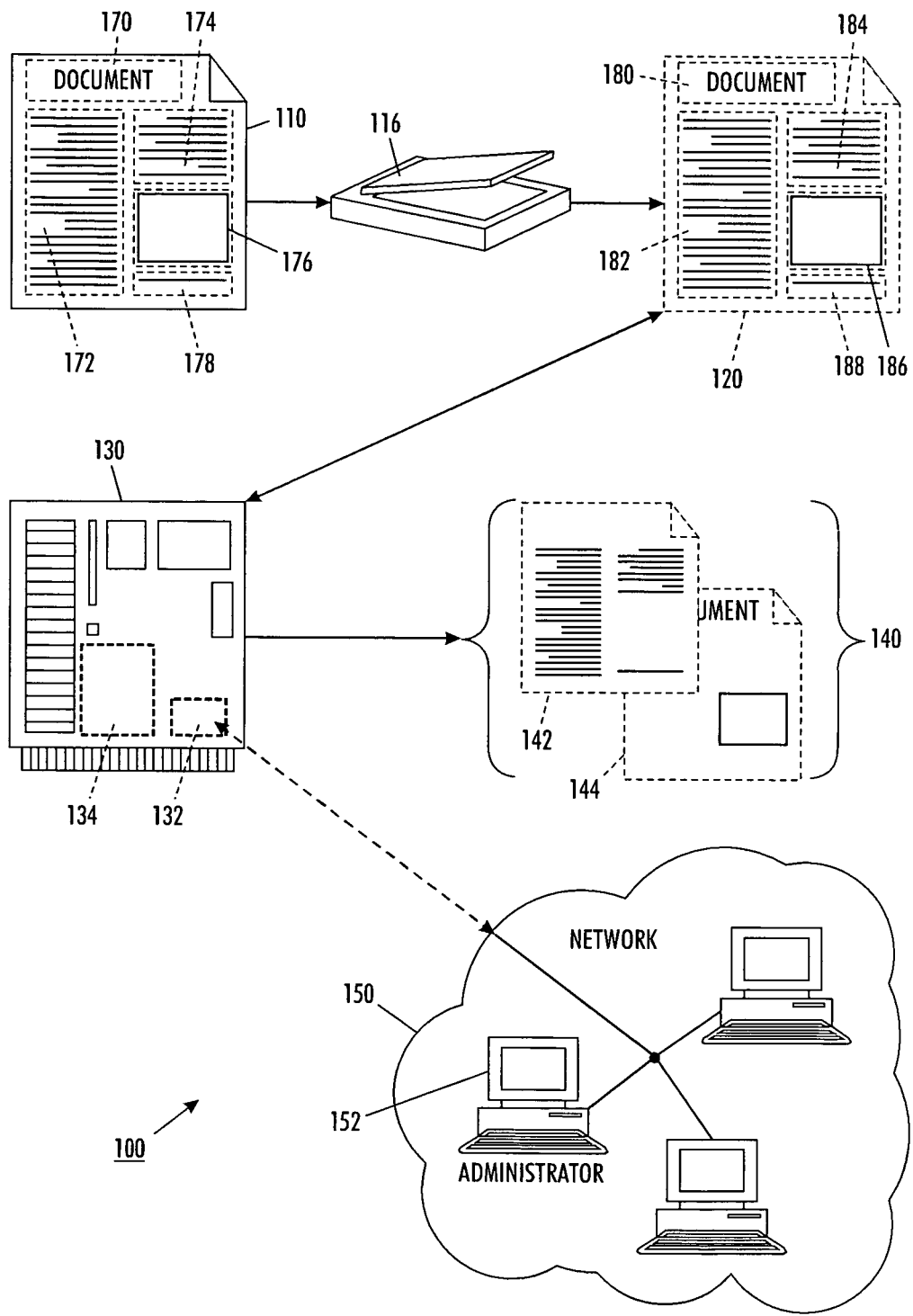
FIG. 1 is a general flow diagram illustrating the flow of information between components of an embodiment for carrying out the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

An "image" is a pattern of physical light. An image may include characters, words, and text as well as other features such as graphics. A text may be included in a set of one or more images, such as in images of the pages of a document. An "image set" is a set of one or more images. An image may be divided into "segments," each of which is itself an image. A segment of an image may be of any size up to and including the whole image. Each location in an image may be called a "pixel." An "image layer" or "image plane" is a representation of at least one image segment wherein each layer or plane consists of similarly represented pixels, for example, a black/white layer and a continuous tone (contone) color layer. The term "black/white" (B/W) is intended to represent image pixels or segments that may be depicted or rendered using a single output color, although the single color is not limited to black.

An "image characteristic" or "characteristic" is a measurable attribute of an image. An operation can "measure" a characteristic by producing data indicating the characteristic using data defining an image. A characteristic is measured "for an image" if the characteristic is measured in a manner that is likely to produce approximately the same result each time it occurs.

A "text" is an arrangement of one or more character or lines of characters; the characters of a text may form words.

An "image input terminal" (IIT) is a device that can receive an image and provide an item of data defining a version of the image. A "scanner" is an image input device that receives an image by a scanning operation, such as by scanning a hardcopy document. A "digital camera" is also an image input device, however a digital camera is generally employed to capture a scene that is not represented on a hardcopy document.

An "image output terminal" (IOT) is a device that can receive an item of data defining an image and provide the image as output. A "printer" is an image output terminal. A "display" is an image output terminal that provides the output image in human viewable form. The visible pattern presented by a display is a "displayed image" or simply "image."

In one embodiment of the present invention, the method described is intended to operate as a computer software driven system. Accordingly, one or more of the process steps described in detail below may operate on a computer platform such as a dedicated digital image processing or digital signal processing subsystem, a print-preprocessor or any suitable computer or workstation capable of receiving, processing and outputting image data. It will also be appreciated that such software may be program data operating on an embedded processor that also serves to provide other functionality to an associated IIT, IOT or similar or peripheral devices.

The present invention enables a system administrator to set up a maximum file size limit for scan-to-export jobs. A special mode could be offered for scan-to-export that guarantees the file size on each document to be with a specified limit. One aspect of the invention is the ability to dynamically change the segments used in the generation of the MRC layers based on the output file size or an estimated output file size. When the output file size is predicted to be larger than a specified limit, then the invention's Automatic Layer Generation (ALG) process pushes more of the colored text/lines into the MRC black mask layer in order to improve the compression ratio at the expense of some loss in color fidelity. Generally, this enables the achievement of much higher image quality (with less ringing on text and images) for a specified compression ratio since one may not have to significantly alter the Q-factor for the JPEG compression of contone image segments.

Referring first to FIG. 1, there is depicted a general flow diagram illustrating the flow of information between components of a system 100 for carrying out the present invention. As illustrated, a hardcopy document 110 is initially presented to an image input device such as a scanner 116 or similar IIT. It will be appreciated that IIT 116 may be a component of a multifunction device, a stand-alone image scanning station, or any of various means for generating a digital image 120 representative of a hardcopy document, a scene, etc. The digital image may be transmitted from the scanner to an image processor 130 (which may be integrated with the scanner in a common housing), and the image processor 130 then operates on the digital image 120 to produce a compressed image 140 suitable for sending through or storage on network 150 via a network controller or interface 132. It will be further appreciated that image processor 130 may include internal memory 134, connected to the image input device for storing the data representing the color digital image. Furthermore, image processor 130 is connected so as to be able to retrieve the image data from memory and operate on the data in accordance with a pre-programmed set of instructions or rules to generate an image file in accordance with a predefined format (e.g., MRC). The image processor, in accordance with an aspect of this invention, and in response to the set of instructions, dynamically controls the size of the image file in response to a predefined requirement such as a file size limitation as will be described in more detail below.

As illustrated with respect to hardcopy document 110, the document is composed of several sections or segments, wherein some of the segments utilize traditional black/white text, while other regions employ color text or line art, continuous tone color, etc. For purposes of describing the exemplary operation of the present invention, hardcopy document 110, as illustrated, includes a title region 170 composed of dark blue text, a descriptive text region 172 composed of black text on a white background, a second descriptive text region 174 composed of green text on a white background, a continuous tone, full-color image region 176, and a caption region 178 composed of red text on a white background. Once scanned and digitized by scanner 116, the resulting image data may be processed by image processor 130 to identify the following image segments: segment 180, corresponding to title region 170, segment 182 corresponding to text region 172, segment 184 corresponding to text region 174, segment 186 corresponding to contone region 176, and segment 188 corresponding to caption text region 178. As will be described in detail herein, the various segments of the image are intended to represent similar image features (e.g., text/line art or continuous tone segments), and they are further split in accordance with the color of the text/line art so as to incorporate contiguous text or line art of the same color.

Figure 2:
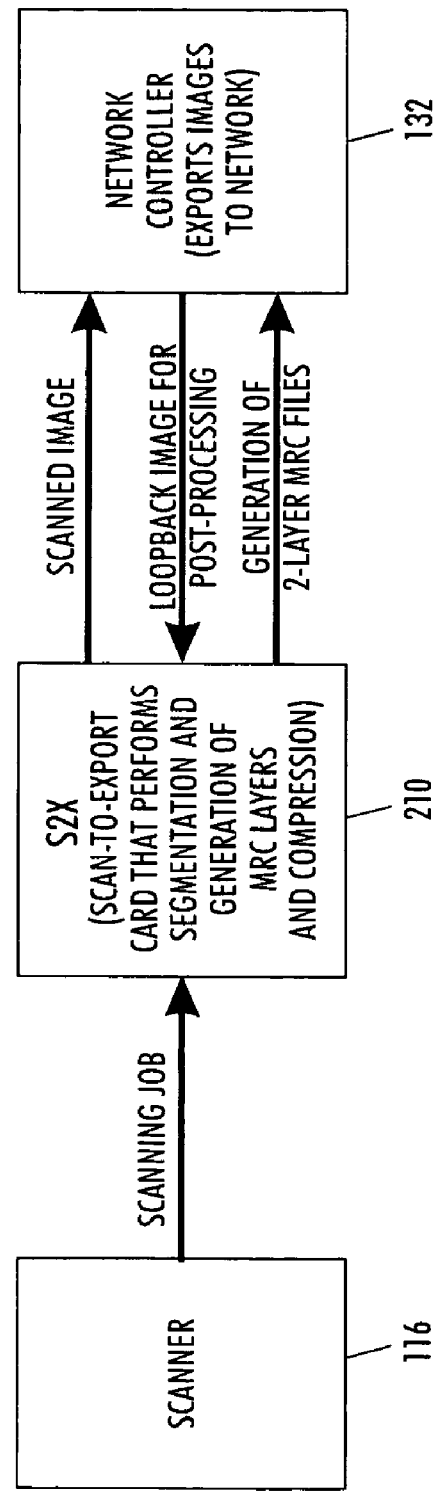
FIG. 2 illustrates a general data flow in accordance with an embodiment of the present invention.

Referring also to FIG. 2, there is depicted a general data flow in accordance with an embodiment of the present invention. More specifically, scanner 116 operates to initiate a scanning job, wherein a scan-to-export function 210 (implemented via an image processor 130 or similar processing device associated with the scanner) segments and compresses the image file in accordance with any predefined size limitations. As will be appreciated, the file size limitations described in accordance with the present invention may be pre-specified size limitations or they may be limitations set in accordance with the input document size (e.g., larger originals may be permitted larger data files). It will also be appreciated that the limitations may be controlled by a system administrator with access to the scanner/image processor, or with network access (e.g., administrator workstation 152). The administrator may be able to further define controls so as to limit sizes based upon user permissions (e.g., certain users may have permission for larger file sizes), free file storage capacity on a storage medium or the network in general, available network bandwidth, or various other variables that are known to be related to network capacity.

The present invention may also be employed as a loopback processor, when connected to a network, wherein the scan-to-export function 210 operates on image files stored on or transmitted over the network, via a network controller or interface 132. In this fashion, the scan-to-export function 210 may operate on various image data to produce multilayer (e.g., two-layer) MRC files for output that meet the predefined file size requirements.

Figure 3:
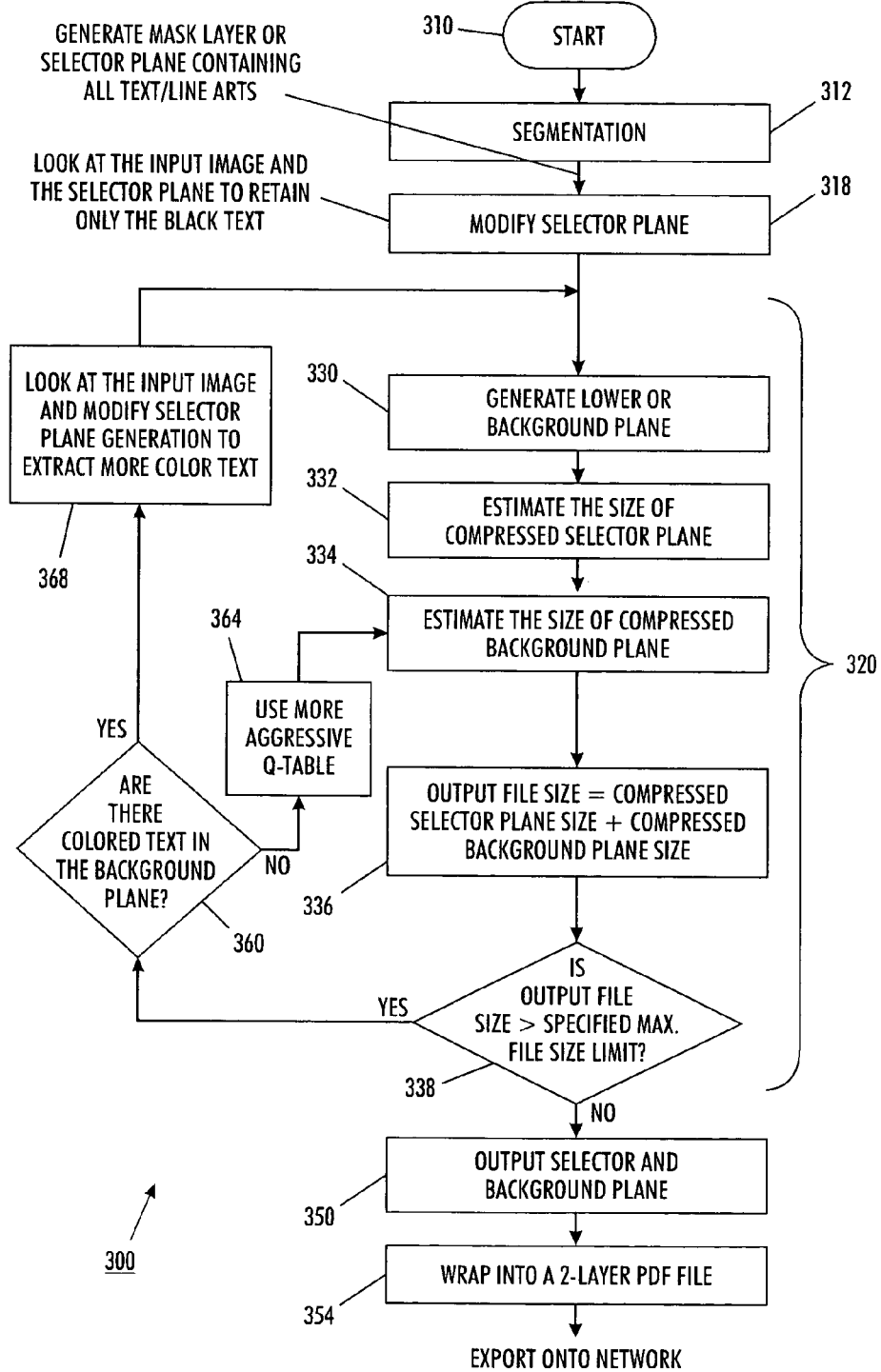
FIG. 3 is a detailed flowchart illustrating various steps employed in a method for dynamically controlling the file size of a color digital image in accordance with the present invention.

Referring next to FIG. 3, depicted therein is a detailed flowchart illustrating various steps employed in the method 300 for dynamically controlling the file size of a color digital image in accordance with the present invention. At the start, step 310, an uncompressed color digital image, or data representing such an image, is received. At step 312, the data is segmented, as previously illustrated with respect to FIG. 1, so as to determine regions or segments of the image having similar image characteristics. In one embodiment, the segmentation process would operate to identify a first set of segments of the image suitable for representation as a single text or edge color (e.g., black on white background) and a second set of segments suitable for representation as text or edge color or contone images. It will also be appreciated that the segments are generated as a function f the color of the text therein such that all adjoining text of one color is associated in a segment whereas text of another color is identified and associated in a second segment. Subsequently, step 318 modifies the selector plane so as to assure that only the black text or line art segments are retained in the selector or foreground plane of the MRC image. Next, as illustrated as the ALG section 320, steps 330–338 are carried out so as to determine the file size of the compressed MRC image file. Step 330 first generates the lower or background plane and then step 332 estimates the resulting size of the compressed selector plane (text/line art) based upon a first compression scheme such as Group 4 TIFF.

Next, step 334 estimates the size of the compressed background layer or plane based upon a second compression scheme such as JPEG (including a factor for the desired Q-factor in the JPEG compression). Step 336 then "sums" the estimated sizes of the compressed selector and background planes so that step 338 may test the sum against a maximum file size. If the estimate is within the required size limit, processing continues at step 350, where the selector and background planes are output and are subsequently wrapped into an MRC output file format, step 354, such as a portable document format (PDF) file for exporting to the network. A representation of such a document is found in FIG. 1, file 140, which includes a first layer 142 having black text on white background and a second layer 144 having contone image segments therein.

In the event that the file size limitation is not met at test step 338, within the ALG process 320, processing continues by first determining at step 360 whether any of the segments previously included in the background plane include text or line art. If not, there are no further segments that can easily be removed from the background plane and further compression of the image file must be accomplished using a more aggressive Q-table for the JPEG compression. Alternatively, as represented by step 368, additional text/line art segments may be removed from the background plane, thereby transforming them to black/white representation. If this is the case, it will be appreciated that this alteration requires re-calculation of the estimates described above as both planes have been impacted by moving the colored text/line art segments so as to represent them as black/white text. As illustrated in the flowchart, once steps 364 or 368 have been completed, the steps relating to the ALG process 320 are repeated, and the process will iterate until the file size limitation is met. The representation of image file 140 in FIG. 1 illustrates a combination of color text segments 184 and 188, with black text segment 182 so as to produce a layer 142, whereas colored text in segment 180 was unmodified and processed as a contone image.

As described above, the specified maximum file size tested in step 338 may be a predefined value that is set by a user or administrator. However, the value may also be determined as a function of a size of the hardcopy document that was used as input to the scanner. The file size may also be a function of the network over which the compressed image is to be transmitted. For example, a file destination may determine which network or storage device the file is to reside on and the network or storage device may have predefined limitations. In other words, a user saving the image to one mass storage device resident on the network may have a first size limitation and an unlimited size limitation if the image is directed to the storage device associated with his/her workstation.

The Automatic Layer Generation feature of the present invention allows mixed documents (having text and contone regions) to achieve a specified compressed size without having to change the Q-factor so as to reduce the quality of contone regions. For documents that do not have much of colored text/line-art, however, it remains possible to use more aggressive Q-table alterations to further reduce the compressed size. The present invention finds particular application in system architectures that use digital signal processing or microprocessors to carry out MRC layer extraction and compression. The estimation of compressed sizes of mask layer and image layer could be done using known techniques. For Group 4 compression, it will be appreciated that there are several methods to estimate the compression ratio of any given image. For example U.S. application Ser. No. 10/315,267, filed Dec. 9, 2002, and directed to a "SYSTEM FOR SELECTING A COMPRESSION METHOD FOR IMAGE DATA," previously incorporated by reference in its entirety, describes one such estimation approach. Since Group 4 compression of mask layers takes only 60–80 msec, one could even consider actually compressing the mask layer to create a more accurate estimate. For JPEG compressed size estimation of background layer, known methods exist to predict the final compressed size. Again in order to get an accurate estimate of the compressed size, one could also consider carrying out the actual JPEG compression. As will be appreciated, the present invention has application to various scanning architectures, including those where MRC generation and compression is done as a post-processing operation and wherein the entire job is first scanned into an image memory (e.g., disk), perhaps on the network and then looped back, to extract the different layers and compress them to be exported on the network. In summary, ALG enables the export of images that do not exceed a specified file size requirement.

As described herein, the present invention may be used to dynamically alter the size of scanned image files based on the export file size, network demand and transmission requirements specified by a system administrator or end user. One embodiment described includes pushing the color text/edges so as to include them in the black mask as a first approach in order to reduce file size at the expense of color fidelity. Secondary operations relating to the image compression may be further employed to reduce file size if necessary. The system and method described may further include alternative methods to reduce the file size based on the user requirement. Such methods may include, for example, aggressive Q-table or different image processing parameters applied to the input scanned image.

In recapitulation, the present invention is a system and method to produce a mixed raster content (MRC) image having a controlled size. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

The invention claimed is:

1. A method for dynamically controlling the file size of a color digital image, comprising:
 (a) receiving uncompressed color digital image data;
 (b) using the digital image data, segmenting the digital image to identify segments of the image, including identification of a first set of segments of the image suitable for representation as a single color and a second set of segments suitable for representation as contone;
 (c) estimating the size of the compressed image based upon said segmenting step, wherein at least first set of segments are to be compressed in accordance with a first method applicable to single color segments to create a first image plane and the second set of segments are to be compressed in accordance with a second method applicable to contone segments to create a second image plane;
 (d) determining whether an estimated size of the compressed image is within a predefined file size limit; and if so, proceeding at step (g), otherwise
 (e) identifying at least one segment within the second set of segments for representation as a single color and for incorporation into said first set of segments and said first image plane;
 (f) repeating the steps above, beginning at step (c);
 (g) creating the first image plane based upon image data for the first set of segments and creating the second image plane based upon image data for the first set of segments, wherein at least the second image plane is compressed; and
 (h) outputting the image data for the first and second image planes.

2. The method of claim 1, wherein the step of receiving uncompressed digital image data further comprises scanning a hardcopy document to create the digital image data.

3. The method of claim 2, wherein said predefined file size limit is determined as a function of a size of the hardcopy document.

4. The method of claim 2, wherein said predefined file size limit is determined as a function of a network over which the compressed image is to be transmitted.

5. The method of claim 2, wherein said step of identifying at least one segment within the second set of segments for representation as a single color includes identifying a segment containing text.

6. The method of claim 5, wherein the said step of identifying at least one segment within the second set of segments for representation as a single color further includes identifying the color of said text.

7. The method of claim 1, further comprising wrapping the data for the first and second image planes into a multi-layer portable document format file.

8. The method of claim 1, wherein the estimated size of the compressed image is based upon a first Q-table, and where the data for at least one of the first and second image planes is produced using an alternate Q-table to achieve a size smaller than the estimated size.

9. The method of claim 1, further comprising storing the data for the first and second image planes on a network.

10. A method for dynamically controlling the file size of a color digital image, comprising:
- (a) presenting a hardcopy document to an image scanner, said image scanner generating uncompressed color digital image data representing the document;
- (b) receiving the uncompressed color digital image data from the scanner;
- (c) using the digital image data, segmenting the digital image to identify segments of the image, including identification of a first set of segments of the image suitable for representation as a single color and a second set of segments suitable for representation as contone;
- (d) estimating the size of the compressed image based upon said segmenting step, wherein at least first set of segments are to be compressed in accordance with a first method applicable to single color segments to create a first image plane and the second set of segments are to be compressed in accordance with a second method applicable to contone segments to create a second image plane;
- (e) determining whether an estimated size of the compressed image is within a predefined file size limit; and if so, proceeding at step (h), otherwise
- (f) identifying at least one segment within the second set of segments for representation as a single color and for incorporation into said first set of segments and said first image plane;
- (g) repeating the steps above, beginning at step (d);
- (h) creating the first image plane based upon image data for the first set of segments and creating the second image plane based upon image data for the first set of segments, wherein at least the second image plane is compressed;
- (i) outputting the image data for the first and second image planes; and
- (j) storing the image data for the first and second image planes on a network.

11. The method of claim 10, wherein identifying at least one segment within the second set of segments for representation as a single color includes identifying a segment containing text.

12. The method of claim 11, wherein identifying at least one segment within the second set of segments for representation as a single color further includes identifying the color of said text.

* * * * *